United States Patent [19]

Lin

[11] Patent Number: 5,896,279
[45] Date of Patent: Apr. 20, 1999

[54] CONSTANT-VOLTAGE CLAMPING FORWARD CONVERSION SWITCHING POWER SUPPLY

[75] Inventor: Kuo-Fan Lin, Taipei Hsein, Taiwan

[73] Assignee: API Technology Co., Ltd., Taipei, Taiwan

[21] Appl. No.: 08/838,615

[22] Filed: Apr. 10, 1997

[51] Int. Cl.[6] .................................................. H02M 3/335

[52] U.S. Cl. ............................................................ 363/21

[58] Field of Search ................................ 363/16, 20, 21, 363/95, 97, 131, 132

[56] References Cited

U.S. PATENT DOCUMENTS

| | | | |
|---|---|---|---|
| 4,318,168 | 3/1982 | Faxon | 363/56 |
| 5,455,757 | 10/1995 | Nguyen et al. | 363/21 |
| 5,598,324 | 1/1997 | Imamura et al. | 363/21 |
| 5,602,724 | 2/1997 | Balakrishnan | 363/21 |

*Primary Examiner*—Matthew Nguyen
*Attorney, Agent, or Firm*—William E. Pelton, Esq.

[57] ABSTRACT

A constant-voltage clamping forward conversion switching power supply is disclosed, which can prevent each of a magnetic saturation phenomenon in a main transformer, an excessive high voltage of a main switching transistor, and a shift effect of an input voltage, and can increase the duty cycle and improve an operating efficiency.

18 Claims, 5 Drawing Sheets

CONSTANT-VOLTAGE CLAMPING FORWARD CONVERSION SWITCHING POWER SUPPLY

BACKGROUND OF THE INVENTION

1. Field of the Invention

The present invention relates to a forward conversion switching power supply, and more particularly to a forward conversion switching power supply in a constant-voltage clamping form, which can prevent each of a magnetic saturation phenomenon in a main transformer, an excessive high voltage of a main switching transistor, and a shift effect of an input voltage, and can increase the duty cycle and improve an operating efficiency.

2. Description of Related Art

A switching power supply has been widely used as the power supply of a computer and in the uninterruptible power supply (UPS) system, since it not only has a small volume and weight, but also has an excellent power usage when it operates in high frequencies. To this end, various kinds of switching power supplies have been developed for appliances.

Figure 4:
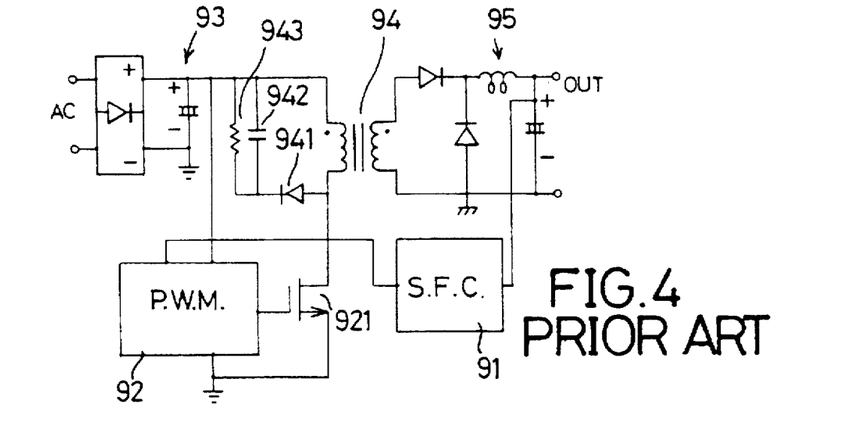
FIG. 4 is a circuit diagram of a conventional passive magnetic flyback forward conversion switching power supply.
Figure 7:
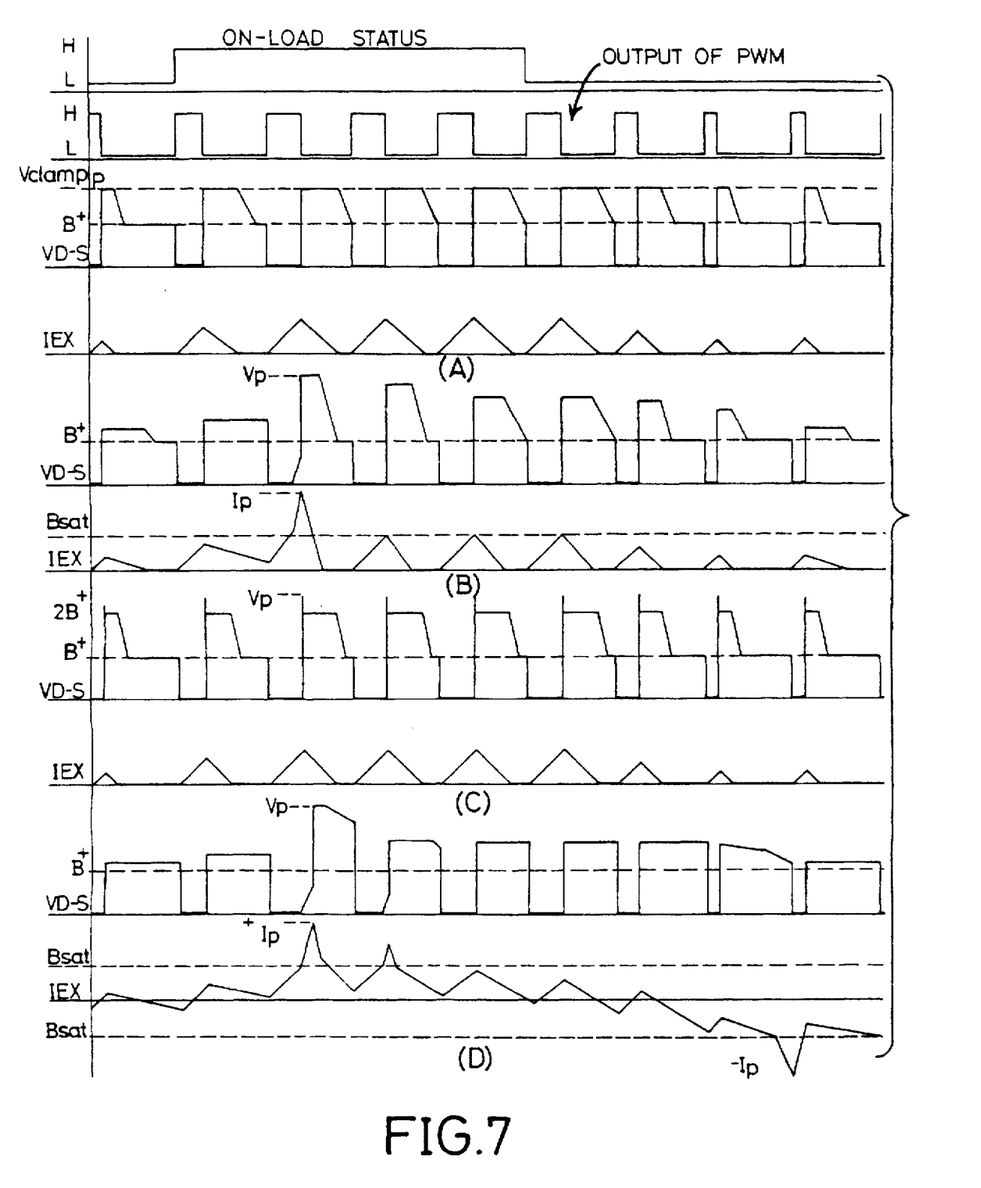
FIG. 7 is a schematic view showing the comparisons about the voltage waveforms, current waveforms and saturation phenomena between the present invention and conventional switching power supplies in the case of dynamic load.

The most fundamental and typical kind of forward conversion switching power supply operates in a manner of a passive flyback magnetic type. Referring to FIG. 4, the kind of switching power supply comprises a primary rectifying filter circuit 93, a transformer 94, a secondary rectifying filter circuit 95, a sampling feedback circuit 91, a pulse width modulator 92 and a main transistor 921. A passive flyback magnetic circuit composed of a diode 941 and a resistor 943 and a capacitor 942 is connected to a primary winding of the transformer 94. The primary rectifying filter circuit 93 rectifies and filters the input alternating current (AC) to supply DC power. The pulse width modulator (PWM) 92 enables the main transistor 921 to switch on/off in high frequencies so that the transformer 94 can operate for purpose of a high-frequency magnetization. Then a secondary winding of the transformer outputs a high-frequency alternating voltage. The high-frequency alternating voltage is rectified and filtered by the secondary rectifying filter circuit 95 and then a desired DC power can be output. Also, the sampling feedback circuit (SFC) 91 sends out a reference voltage responsive to the output voltage OUT to the pulse width modulator 92 so that the pulse width modulator 92 can change the duty cycle with which the main transistor switches on/off according to the magnitude of the output voltage OUT. Thereby, the output voltage OUT can be stabilized at a desired value. Further, the passive flyback magnetic circuit (including the resistor 943, the capacitor 942, and the diode 941) can absorb the flyback magnetic current of the transformer 94. This kind of switching power supply has a disadvantage of great power loss. A second disadvantage is that the switching power supply can not reach a dynamic compensation when the load varies. In this case, a serious saturation current will occur in the transformer and abnormal waves may occur on the main transistor, as shown in FIG. 7B. Therefore, an element with high withstand voltage needs to be used as the main transistor. A third disadvantage is that the main transistor has an excessively high peak current (see FIG. 7), a poor response to the dynamic load and great noise.

Figure 5:
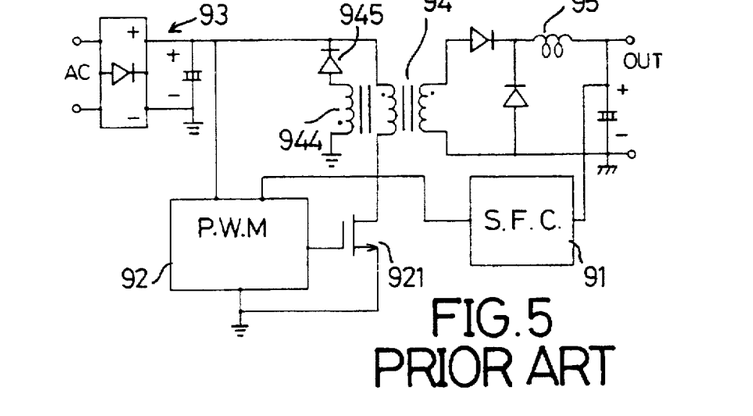
FIG. 5 is a circuit diagram of a conventional clamping coil forward conversion switching power supply.

Another conventional kind of switching power supply operates in the form of a a clamping coil, as shown in FIG. 5. The switching power supply has a basic circuit similar to that in FIG. 4. The difference is that the transformer 94 in FIG. 5 has a secondary winding 944 connected in series with a diode 945 and between the primary winding and the ground. The secondary winding 944 is provided for generating an induced current opposed to the primary winding to offset the magnetizing current. This kind of switching power supply also has a disadvantage that the main transistor must utilize an element with high withstand voltage, as shown in FIG. 7C. Another disadvantage is that a duty cycle thereof is adapted to be no more than 50% because the turns ratio of the secondary winding of the transformer 94 limits the effective duty cycle.

Figure 6:
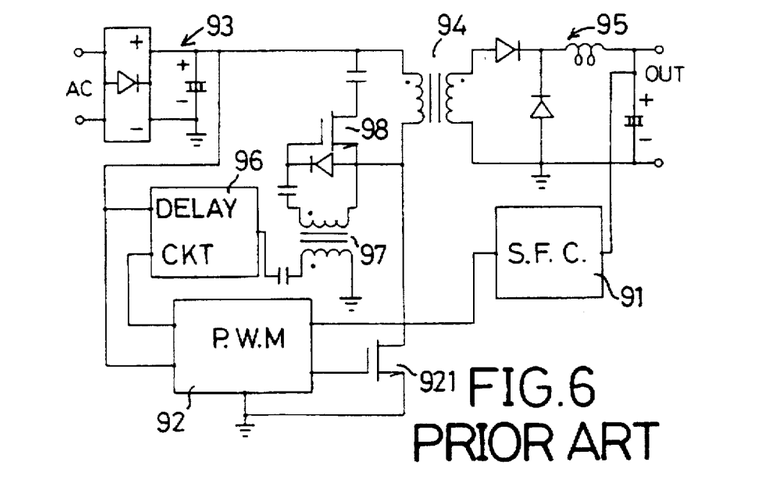
FIG. 6 is a circuit diagram of a conventional dynamic clamping forward conversion switching power supply.

A third kind of switching power supply is a dynamic clamping type. Referring to FIG. 6, the switching power supply has a delay circuit 946, an additional transformer 97, and a clamping transistor 98 connected in parallel with the primary winding of the main transformer 94. By this arrangement, the clamping transistor 98 will be appropriately turned on and turned off according to the operating mode of the pulse width modulator so as to dynamically absorb the flyback magnetic current. However, this kind of switching power supply also generates a serious saturation current when the load varies, as shown in FIG. 7D. Further, great noise will occur due to the saturating peak current applied on the clamping transistor 98. Particularly, in the case of a low load, the switching power supply has the lowest efficiency due to the switching loss in the clamping transistor.

The present invention provides an improved constant-voltage clamping forward conversion switching power supply to mitigate and/or obviate the aforementioned problems.

SUMMARY OF THE INVENTION

One object of the present invention is to provide a constant-voltage clamping forward conversion switching power supply which obtains an excellent dynamic load response. When the load varies dynamically, a magnetic saturation phenomenon will not occur in a main transformer because magnetizing current zeros in every cycle.

Another object of the present invention is to provide a constant-voltage clamping forward conversion switching power supply which can utilize the transistor elements with low withstand voltage and low current because a terminal voltage of a main switching transistor is low and an excessive peak value current will not be generated.

A further object of the present invention is to provide a constant-voltage clamping forward conversion switching power supply which has a high efficiency in the case of heavy-duty, as well as low load, because there is no switching loss in the clamping transistor.

A further object of the present invention is to provide a constant-voltage clamping forward conversion switching power supply which has low operating noise and a high duty cycle of more than 75%.

In accordance with one aspect of the present invention, a constant-voltage clamping forward conversion switching power supply comprises a basic circuit and a constant voltage clamping circuit. The basic circuit is composed of a primary rectifying filter circuit and a secondary rectifying filter circuit, a sampling feedback circuit, a pulse width modulator, a main switching transistor, and a main transformer. The constant-voltage clamping circuit is disposed between the primary rectifying filter circuit and a first winding of the main transformer. The constant-voltage clamping circuit includes a voltage sampling circuit for receiving an induced voltage from a second winding of the main transformer and converting the induced voltage to positive and negative peak voltage signals, a synchronous pulse width modulator circuit for generating an output signal indicative of width variation of a square-wave responsive to the level of the input peak voltage, a constant-voltage driving circuit for converting the output signal indicative of the width variation of a square-wave to a current amplifying signal and limiting a maximum value of the current amplifying signal, and a recuperator circuit connected in series between the primary rectifying filter circuit and the first winding of the main transformer to receive the current amplifying signal input by the constant-voltage driving circuit and to absorb magnetic flyback energy generated by the main transformer in a switching manner and convert it to supply power. Thereby, the magnetizing current and the magnetic flyback current of the main transformer can be coupled continuously and limit the voltage across the first winding of the main transformer in a specified range in the case of heavy-duty and low load, as well as variation of the input voltage.

In accordance with another aspect of the present invention, a constant-voltage clamping forward conversion switching power supply comprises a basic circuit and a constant-voltage clamping circuit. The basic circuit is composed of a primary rectifying filter circuit and a secondary rectifying filter circuit, a sampling feedback circuit, a pulse width modulator, a main switching transistor, and a main transformer. The constant-voltage clamping circuit is disposed between the primary rectifying filter circuit and a first winding of the main transformer. The constant-voltage clamping circuit includes a voltage sampling circuit having positive and negative peak diodes and capacitors, for receiving an induced voltage from a second winding of the main transformer and converting the induced voltage to positive and negative peak voltage signals, a synchronous pulse width modulator circuit having a voltage detecting circuit and a synchronous pulse width generator, for generating an output signal indicative of width variation of a square-wave responsive to the level of the input peak voltage, a constant-voltage driving circuit having a current amplifying transistor for converting the output signal indicative of the width variation of a square-wave to a current amplifying signal and limiting a maximum value of the current amplifying signal, and a recuperator circuit connected in series between the primary rectifying filter circuit and the first winding of the main transformer. The recuperator circuit has a constant-voltage driving transistor, a magnetizing coil located at one side of the constant-voltage driving transistor, a diode and a capacitor connected between the primary windings of the main transformer to receive the current amplifying signal input by the constant-voltage driving circuit and to absorb magnetic flyback energy generated by the main transformer in a switching manner and convert it to the energy of the primary rectifying filter circuit. Thereby, the magnetization current and the magnetic flyback current of the main transformer can be coupled continuously to limit the voltage across the first winding of the main transformer in a specified range in the case of heavy-duty and low load, as well as variation of the input voltage.

Other objects, advantages and novel features of the invention will become more apparent from the following detailed description when taken in conjunction with the accompanying drawings.

DETAILED DESCRIPTION OF PREFERRED EMBODIMENT

Figure 1:
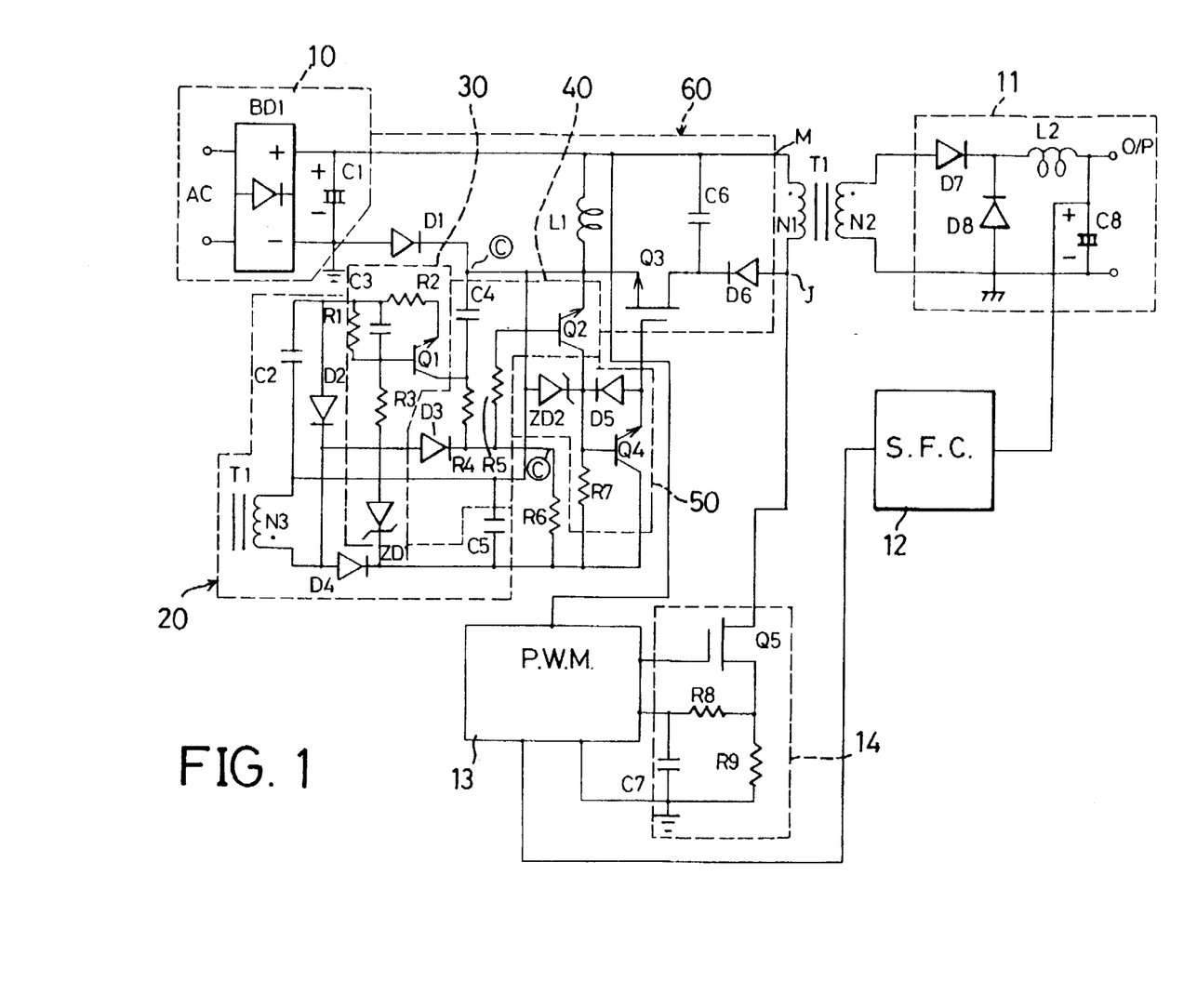
FIG. 1 is a circuit diagram of the constant-voltage clamping forward conversion switching power supply in accordance with the present invention.

Referring to FIG. 1, similar to the conventional switching power supplies, a constant-voltage clamping switching power supply in accordance with the present invention includes a basic circuit composed of a primary and a secondary rectifying filter circuit 10, 11, a sampling feedback circuit 12, a pulse width controller 13, a switching circuit 14 formed by a main switching transistor Q5, and a main transformer T1. The improvement of this invention is that the constant-voltage clamping forward conversion switching power supply further has a constant-voltage clamping circuit disposed between the primary rectifying filter circuit 10 and a first winding of the main transformer T1. The constant-voltage clamping circuit comprises a synchronous pulse width modulator circuit, a voltage driving circuit 50 and a recuperator circuit 60. The synchronous pulse width modulator circuit is composed of a voltage sampling circuit 20, a voltage detecting circuit 30 and a synchronous pulse width generator 40. With this arrangement, the forward conversion switching power supply can prevent the main transformer T1 from saturation, decrease the withstand voltage of the main switching transistor Q5 and reduce the peak-to-peak current. Further, in the case that a heavy-duty or a low load is applied or the input voltage varies, the forward conversion switching power supply in accordance with the present invention has an excellent operating efficiency.

The structures and functions of above mentioned circuits now will be described in detail.

The voltage sampling circuit 20 comprises a second winding N3 of the main transformer T1, two diodes D2, D4, and two capacitors C2, C5 for respectively storing positive and negative peak voltages generated by the second winding N3 at terminals of the two capacitors C2, C5, thereby generating positive and negative peak voltages according to the operating mode of the main transformer T1. The magnitudes of the peak voltages output by the voltage sampling circuit 20 can be adjusted according to requirements, depending on the turns ratio of the first winding to the second winding of the main transformer T1.

The voltage detecting circuit 30 of the synchronous pulse width modulator circuit comprises a Zener diode ZD1, resistors R1, R2, and R3, and a transistor Q1 for detecting the terminal voltage variation of the capacitors C2, C5 of the voltage sampling circuit 20 and converting the terminal voltage variation to current variation. The transistor Q1 is provided for controlling the synchronous pulse width generator 40.

Figure 2:
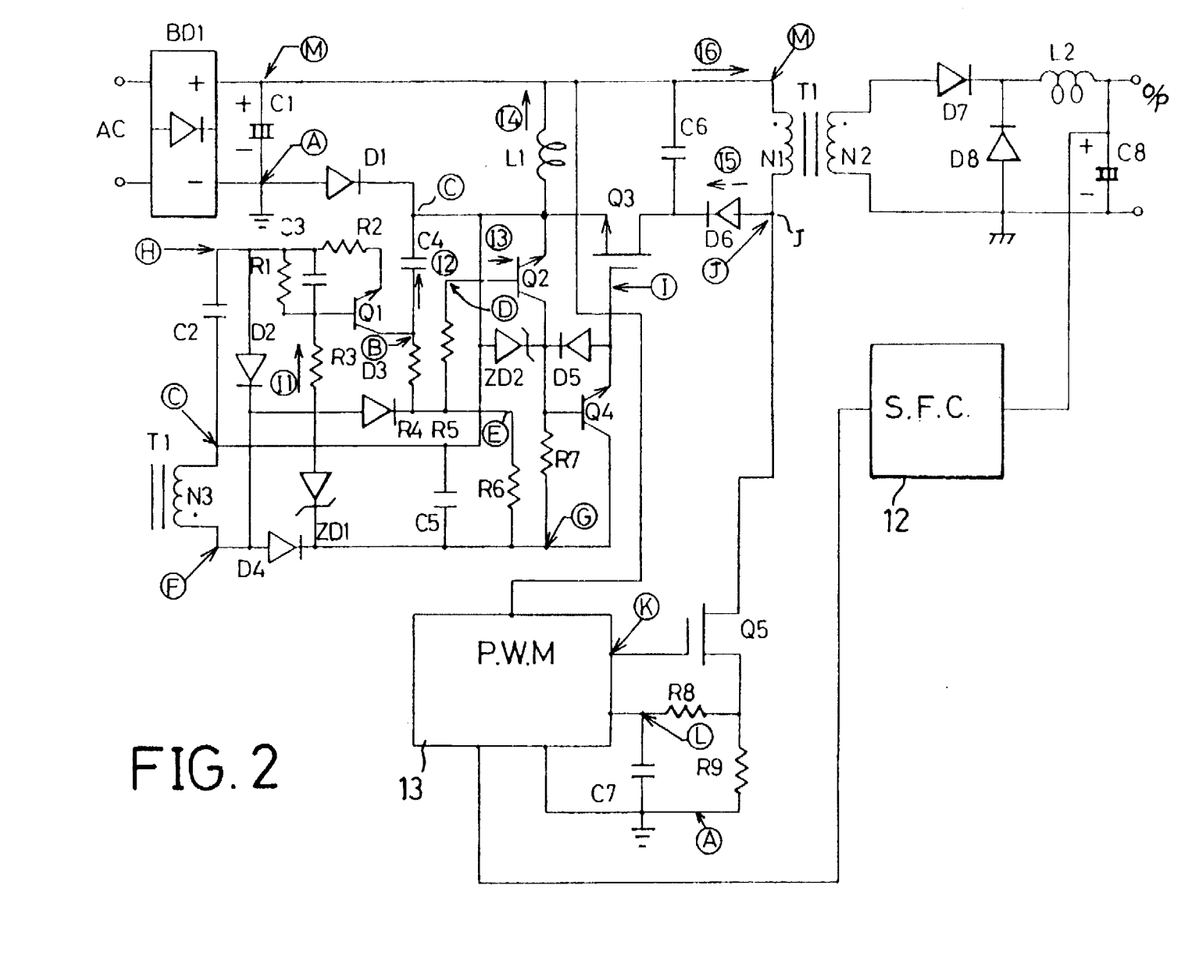
FIG. 2 is a schematic view showing the circuit diagram of FIG. 1, including the indications of terminals and currents thereof.
Figure 3:
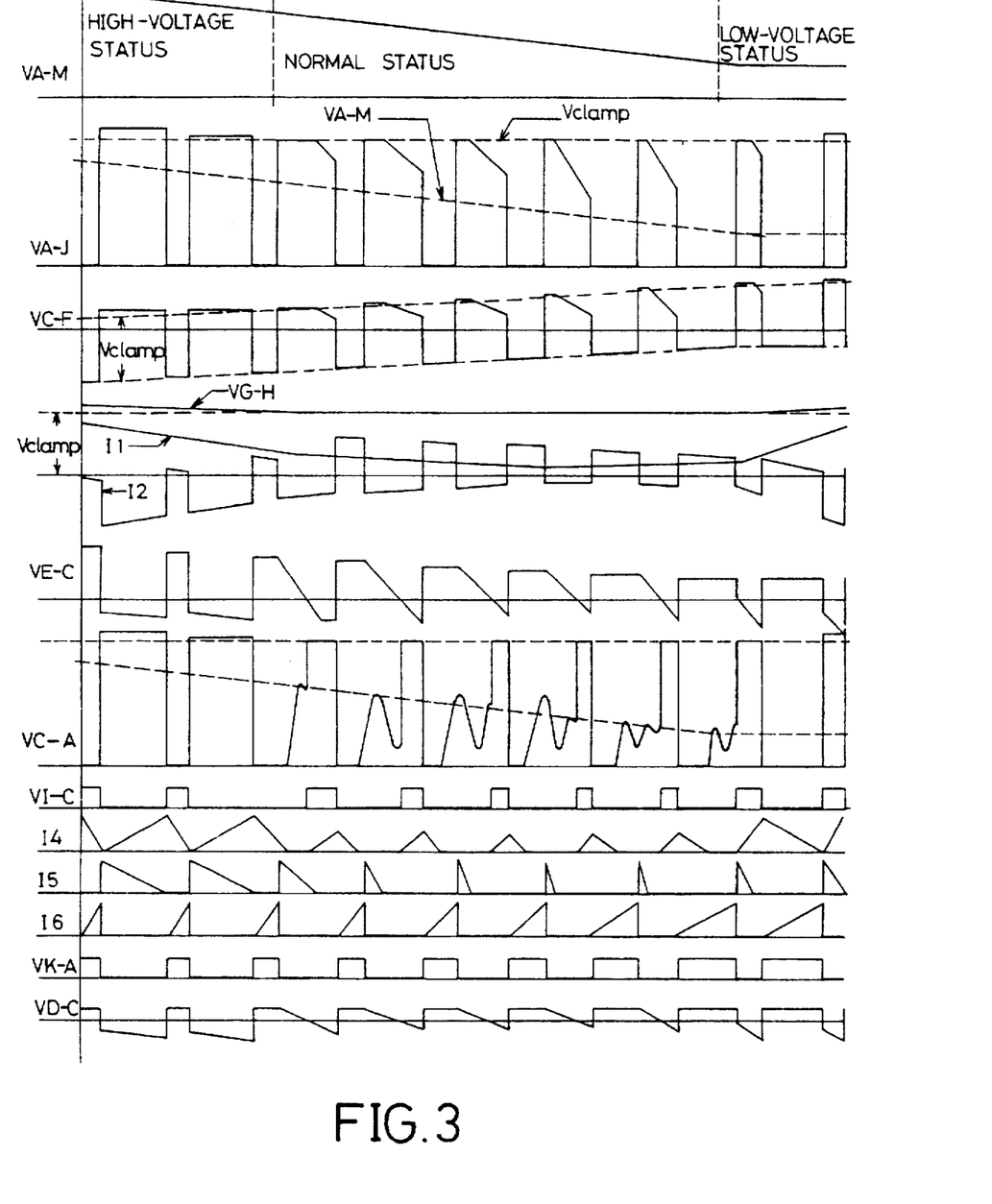
FIG. 3 is a schematic view showing waveforms of the voltage and current of each part in FIG. 1.

The synchronous pulse width generator 40 of the synchronous pulse width modulator circuit comprises a diode D3, resistors R4 and R5, a capacitor C4 and a transistor Q2. The synchronous pulse width generator 40 is connected to the second winding N3 of the main transformer T1 via the diode D3. One end of the capacitor C4 is connected to the collector electrode of the transistor Q1 of the voltage detecting circuit 30. By this arrangement, when the second winding N3 generates an induced voltage, a positive half-cycle of the induced voltage charges the capacitor C4 through the resistor R4, and the transistor Q1 discharges the capacitor C4 with a constant current with respect to the variation of the input voltage magnitude. The discharge of the capacitor C4 enables the waveform variation of the voltage $V_{E-C}$ (see FIG. 2) between the terminals E, C of the resistor R4 and the capacitor C4 to be synchronous with that of the main transformer T1, as shown in FIG. 3. Also, the voltage $V_{E-C}$ drives the transistor Q2 through the resistor R5 so that a square-wave output varied as the variation of sampling voltages can be generated at the collector of the transistor Q2.

The constant-voltage driving circuit 50 comprises a Zener diode ZD2, a diode D5, a resistor R7 and a transistor Q4. The Zener diode ZD2 is provided for limiting the maximum value of the square-wave output of the transistor Q2 of the synchronous pulse width generator 40 to provide a clamped voltage. The diode D5 is provided for limiting the voltage between the base and the emitter of the transistor Q4 and operating in a phase reversal manner as the square-wave signal of the transistor Q2, thereby driving a constant-voltage driving transistor Q3 of the recuperator circuit 60.

The recuperator circuit 60 is connected in series between the primary rectifying filter circuit 10 and the first winding of the main transformer T1 and comprises the constant-voltage driving transistor Q3, a magnetizing coil L1, two diodes D1, D6, and a capacitor C6. With the recuperator circuit 60, the magnetizing energy of the main transformer T1 can be stored in the capacitor C6 through the diode D6, then the transistor Q3 can be driven by the constant-voltage to switch on/off under the control of the above-mentioned constant-voltage clamping circuit, therefore, the stored magnetizing energy can be transmitted to the magnetizing coil L1. Finally, the magnetic flyback energy of the magnetizing coil L1 will charge the capacitor C1 of the primary rectifying filter circuit 10 through the diode D1 to form a magnetic flyback reversal effect without loss. Furthermore, the recuperator circuit 60 limits the peak-to-peak voltage of the first winding N1 of the main transformer 10. Accordingly, the main transformer T1 obtains an excellent magnetic flyback effect, without causing a magnetic saturation, in the case of low load, as well as heavy-duty. The voltage and current variation of each operating terminal and part of the switching power supply circuit are shown in FIG. 2 and FIG. 3 for reference.

Also, with the present invention, magnetic saturation will not occur in the case that an input voltage varies. Referring to FIG. 3, when the input voltage $V_{A-M}$ is beyond the upper limit and the lower limit (see the first section and the third section as shown in FIG. 3), the Zener diode ZD1 of the voltage detecting circuit 30 will be completely turned on or turned off to prolong or shorten the charge time of the capacitor C4 of the synchronous pulse width generator 40. If the input voltage is too high, the transistor Q1 of the voltage detecting circuit will be completely turned on to equate the positive and negative wave widths between the terminals B and E of the resistor R4 with that of the first winding N1 of the main transformer T1. Since the switching cycle with which the constant-voltage drives the transistor Q3 is equal to that of the main switching transistor Q5, the magnetizing current I6 of the main transformer T1 (see FIG. 2) is equal to the magnetic flyback current I5, as well as the magnetizing current I4 of the magnetizing coil L1. If the inductance of the magnetizing coil is set to equal that of the first winding N1 of the main transformer T1, the energy obtained by the capacitor C6 in an ON cycle equals that obtained by the capacitor C1 in an OFF cycle. Therefore, the first winding N1 of the main transformer T1 will present a square-wave form at the terminals thereof. The magnetizing coil L1 also presents a square-wave form at the terminals thereof and the magnetizing current and the magnetic reversal current, the magnetization current and the magnetic flyback current in the coil L1 are respectively and continuously coupled to each other. In this way, magnetic saturation will not occur in the main transformer T1.

The present invention provides a forward conversion switching power supply which synchronously detects the magnetizing state thereof. The variation of the input voltage can be detected through the voltage detecting circuit 30 the synchronous pulse width generator 40 is able to generate a corresponding wave-width current driving signal. The constant-voltage driving circuit 50 is used to make the recuperator circuit 60 operate dynamically. In this manner, the magnetic flyback energy can be absorbed rapidly and the magnetic saturation will not occur in the main transformer T1 in the case of heavy-duty and low load, as well as variation of the input voltage. Further, with the design of constant-voltage clamping, an over variation of the peak value across the first winding N1 of the main transformer T1 will be avoided and the terminal voltage and the peak current of the main switching transistor Q5 can be decreased.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A constant-voltage clamping forward conversion switching power supply comprising:

a basic circuit composed of a primary rectifying filter circuit, a secondary rectifying filter circuit, a sampling feedback circuit, a pulse width modulator, a main switching transistor, and a main transformer; and a constant-voltage clamping circuit disposed between the primary rectifying filter circuit and a first winding of the main transformer, said constant-voltage clamping circuit including:

a voltage sampling circuit for receiving an induced voltage from a second winding of the main transformer and converting the induced voltage to positive and negative peak voltage signals;

a synchronous pulse width modulator circuit for generating an output signal indicative of width variation of a square-wave responsive to the level of the input peak voltage;

a constant-voltage driving circuit for converting the output signal indicative of the width variation of a square-wave to a current amplifying signal and limiting a maximum value of the current amplifying signal; and a recuperator circuit connected in series between the primary rectifying filter circuit and the first winding of the main transformer to receive the current amplifying signal input by the constant-voltage driving circuit and to absorb magnetic flyback energy generated by the main transformer in a switching manner and to convert the magnetic flyback energy to supply power;

thereby, the magnetizing current and the magnetic flyback current of the main transformer can be coupled continuously to limit the voltage across the first winding of the main transformer in a specified range in the case of heavy-duty and low load, as well as variation of the input voltage.

2. A constant-voltage clamping forward conversion switching power supply as claimed in claim 1, wherein said voltage sampling circuit includes positive and negative peak diodes and capacitors.

3. A constant-voltage clamping forward conversion switching power supply as claimed in claim 1, wherein said synchronous pulse width modulator circuit includes a voltage detecting circuit and a synchronous pulse width generator.

4. A constant-voltage clamping forward conversion switching power supply as claimed in claim 3, wherein said voltage detecting circuit includes at least one constant-current circuit composed of a Zener diode and a transistor and provided for determining the conducting state of the transistor according to the variation of a peak voltage input by the voltage sampling circuit.

5. A constant-voltage clamping forward conversion switching power supply as claimed in claim 3, wherein said synchronous pulse width generator includes at least one capacitor charged by the peak voltage and a current amplifying transistor connected to the terminal of the peak voltage, said capacitor having a terminal connected to the transistor of the voltage detecting circuit in order to control the charge of the capacitor by the voltage detecting circuit and enable the current amplifying transistor to output square-wave signals.

6. A constant-voltage clamping forward conversion switching power supply as claimed in claim 4, wherein said synchronous pulse width generator includes at least one capacitor charged by the peak voltage and a current amplifying transistor connected to the terminal of the peak voltage, said capacitor having a terminal connected to the transistor of the voltage detecting circuit in order to control the charge of the capacitor by the voltage detecting circuit and enable the current amplifying transistor to output square-wave signals.

7. A constant-voltage clamping forward conversion switching power supply as claimed in claim 5, wherein said synchronous pulse width generator is coupled to a positive peak voltage signal.

8. A constant-voltage clamping forward conversion switching power supply as claimed in claim 6, wherein said synchronous pulse width generator is coupled to a positive peak voltage signal.

9. A constant-voltage clamping forward conversion switching power supply as claimed in claim 1, wherein said constant-voltage driving circuit at least includes a current amplifying transistor.

10. A constant-voltage clamping forward conversion switching power supply as claimed in claim 7, wherein said constant-voltage driving circuit further includes a Zener diode to limit the output level of the driving circuit.

11. A constant-voltage clamping forward conversion switching power supply as claimed in claim 1, wherein said recuperator circuit at least includes a diode and a capacitor connected between the first windings of the main transformer, a constant-voltage driving transistor, and a magnetizing coil, said constant-voltage driving transistor transmitting the transformer magnetic flyback energy stored in the capacitor to the magnetizing coil in a conducting state and said magnetizing coil charging the primary rectifying filter circuit.

12. A constant-voltage clamping forward conversion switching power supply comprising:

a basic circuit composed of a primary rectifying filter circuit, a secondary rectifying filter circuit, a sampling feedback circuit, a pulse width modulator, a main switching transistor, and a main transformer; and a constant-voltage clamping circuit disposed between the primary rectifying filter circuit and a first winding of the main transformer, said constant-voltage clamping circuit comprising:

a voltage sampling circuit having positive and negative peak diodes and capacitors, for receiving an induced voltage from a second winding of the main transformer and converting the induced voltage to positive and negative peak voltage signals;

a synchronous pulse width modulator circuit having a voltage detecting circuit and a synchronous pulse width generator, for generating an output signal indicative of width variation of a square-wave responsive to the level of the input peak voltage;

a constant-voltage driving circuit having a current amplifying transistor for converting the output signal indicative of the width variation of a square-wave to a current amplifying signal and limiting a maximum value of the current amplifying signal; and a recuperator circuit connected in series between the primary rectifying filter circuit and the first winding of the main transformer, said recuperator circuit having a constant-voltage driving transistor, a magnetizing coil located at one side of the constant-voltage driving transistor, a diode and a capacitor connected between the primary windings of the main transformer to receive the current amplifying signal input by the constant-voltage driving circuit and to absorb magnetic flyback energy generated by the main transformer in a switching manner and convert the flyback energy to the energy of the primary rectifying filter circuit;

thereby the magnetization current and the magnetic reversal current of the main transformer can be coupled continuously to limit the voltage across the first winding of the main transformer in a specified range in the case of heavy-duty and low load, as well as variation of the input voltage.

13. A constant-voltage clamping forward conversion switching power supply as claimed in claim 12, wherein said voltage detecting circuit includes at least one constant-current circuit composed of a Zener diode and a transistor and provided for determining the conducting state of the transistor according to the variation of a peak voltage input by the voltage sampling circuit.

14. A constant-voltage clamping forward conversion switching power supply as claimed in claim 12, wherein said synchronous pulse width generator includes at least one capacitor charged by the peak voltage and a current amplifying transistor connected to the terminal of the peak voltage, said capacitor having a terminal connected to the transistor of the voltage detecting circuit in order to control the charge of the capacitor by the voltage detecting circuit and enable the current amplifying transistor to output square-wave signals.

15. A constant-voltage clamping forward conversion switching power supply as claimed in claim 13, wherein said synchronous pulse width generator includes at least one capacitor charged by the peak voltage and a current amplifying transistor connected to the terminal of the peak voltage, said capacitor having a terminal connected to the transistor of the voltage detecting circuit in order to control the charge of the capacitor by the voltage detecting circuit and enable the current amplifying transistor to output square-wave signals.

16. A constant-voltage clamping forward conversion switching power supply as claimed in claim 14, wherein said synchronous pulse width generator is coupled to a positive peak voltage signal.

17. A constant-voltage clamping forward conversion switching power supply as claimed in claim 15, wherein said synchronous pulse width generator is coupled to a positive peak voltage signal.

18. A constant-voltage clamping forward conversion switching power supply as claimed in claim 12, wherein said constant-voltage driving circuit further includes a Zener diode to limit the output level of the driving circuit.

* * * * *